(12) United States Patent
Guthery (10) Patent No.: US 9,032,058 B2
(45) Date of Patent: May 12, 2015

(54) USE OF SNMP FOR MANAGEMENT OF SMALL FOOTPRINT DEVICES

(75) Inventor: Scott B. Guthery, Chestnut Hill, MA (US)

(73) Assignee: Assa Abloy AB (SE)

( * ) Notice: Subject to any disclaimer, the term of this patent is extended or adjusted under 35 U.S.C. 154(b) by 644 days.

(21) Appl. No.: 12/480,505

(22) Filed: Jun. 8, 2009

(65) Prior Publication Data

US 2010/0235487 A1  Sep. 16, 2010

Related U.S. Application Data

(60) Provisional application No. 61/160,177, filed on Mar. 13, 2009.

(51) Int. Cl.
*G06F 15/173* (2006.01)
*H04L 12/24* (2006.01)
*H04L 29/06* (2006.01)

(52) U.S. Cl.
CPC ........ *H04L 41/0213* (2013.01); *H04L 63/0853* (2013.01)

(58) Field of Classification Search
USPC .......................................... 709/221, 222, 224
See application file for complete search history.

(56) References Cited

U.S. PATENT DOCUMENTS

| | | | |
|---|---|---|---|
| 3,920,896 A | 11/1975 | Bishop et al. | |
| 3,958,088 A | 5/1976 | Vieri | |
| 4,703,503 A | 10/1987 | Asai | |
| 5,036,461 A | 7/1991 | Elliott et al. | |
| 5,146,499 A | 9/1992 | Geffrotin | |
| 5,377,997 A * | 1/1995 | Wilden et al. | 463/43 |
| 5,438,650 A * | 8/1995 | Motoyama et al. | 358/1.15 |
| 5,572,195 A | 11/1996 | Heller et al. | |
| 5,649,118 A | 7/1997 | Carlisle et al. | |
| 5,651,006 A | 7/1997 | Fujino et al. | |
| 5,657,388 A | 8/1997 | Weiss | |
| 5,758,083 A | 5/1998 | Singh et al. | |
| 5,822,435 A | 10/1998 | Boebert et al. | |
| 5,828,830 A | 10/1998 | Rangaraian et al. | |

(Continued)

FOREIGN PATENT DOCUMENTS

| | | |
|---|---|---|
| EP | 0668579 | 8/1995 |
| EP | 1724684 | 5/2005 |

(Continued)

OTHER PUBLICATIONS

International Search Report for International (PCT) Patent Application No. PCT/US10/26477, mailed Apr. 28, 2010.

(Continued)

*Primary Examiner* — Backhean Tiv
(74) *Attorney, Agent, or Firm* — Sheridan Ross P.C.

(57) ABSTRACT

Methods, devices, and systems are provided for managing and controlling small footprint devices with a lightweight control protocol, such as SNMP. Relatively small control messages are employed that have a compact command portion included in an object identifier portion, thereby circumventing the need for a separate command portion as well as a data body. Also, methods, devices, and systems for improving the security and privacy of processing SNMP messages on SNMP-managed devices by moving this processing together with the sensitive data that the process employ such as cryptographic keys inside the tamper-resistant and tamper-evident boundary of an integrated circuit card.

25 Claims, 5 Drawing Sheets

(56) References Cited

U.S. PATENT DOCUMENTS

| | | | |
|---|---|---|---|
| 5,987,513 A * | 11/1999 | Prithviraj et al. | 709/223 |
| 5,999,629 A * | 12/1999 | Heer et al. | 705/51 |
| 6,088,450 A | 7/2000 | Davis et al. | |
| 6,157,966 A | 12/2000 | Montgomery et al. | |
| 6,219,718 B1 * | 4/2001 | Villalpando | 719/317 |
| 6,257,486 B1 | 7/2001 | Telcher et al. | |
| 6,272,542 B1 | 8/2001 | Barnes et al. | |
| 6,356,949 B1 * | 3/2002 | Katsandres et al. | 709/238 |
| 6,360,258 B1 * | 3/2002 | LeBlanc | 709/223 |
| 6,367,011 B1 | 4/2002 | Lee et al. | |
| 6,484,225 B2 | 11/2002 | Sheikh et al. | |
| 6,490,680 B1 | 12/2002 | Scheidt et al. | |
| 6,516,357 B1 | 2/2003 | Hamann et al. | |
| 6,601,200 B1 * | 7/2003 | Delp et al. | 714/724 |
| 6,615,264 B1 | 9/2003 | Stolz et al. | |
| 6,616,035 B2 | 9/2003 | Ehrensvard et al. | |
| 6,616,535 B1 | 9/2003 | Nishizaki et al. | |
| 6,675,351 B1 | 1/2004 | Leduc | |
| 6,757,280 B1 | 6/2004 | Wilson, Jr. | |
| 6,823,453 B1 | 11/2004 | Hagerman | |
| 6,857,566 B2 | 2/2005 | Wankmueller | |
| 6,880,752 B2 | 4/2005 | Tarnovsky et al. | |
| 6,959,394 B1 | 10/2005 | Brickell et al. | |
| 6,986,139 B1 | 1/2006 | Kubo | |
| 6,990,588 B1 | 1/2006 | Yasukura | |
| 7,036,146 B1 | 4/2006 | Goldsmith | |
| 7,070,091 B2 * | 7/2006 | Hepworth et al. | 235/375 |
| 7,092,915 B2 | 8/2006 | Best et al. | |
| 7,096,282 B1 | 8/2006 | Wille | |
| 7,171,654 B2 | 1/2007 | Werme et al. | |
| 7,194,628 B1 | 3/2007 | Guthery | |
| 7,242,694 B2 | 7/2007 | Beser | |
| 7,270,266 B2 | 9/2007 | Silverbrook et al. | |
| 7,287,695 B2 | 10/2007 | Wankmueller | |
| 7,321,566 B2 | 1/2008 | Fu | |
| 7,363,489 B2 | 4/2008 | Burakoff et al. | |
| 7,406,592 B1 | 7/2008 | Polyudov | |
| 7,500,606 B2 | 3/2009 | Park et al. | |
| 7,506,041 B1 | 3/2009 | Shelton et al. | |
| 7,620,041 B2 | 11/2009 | Dunn et al. | |
| 7,624,441 B2 | 11/2009 | Barkan et al. | |
| 7,669,212 B2 | 2/2010 | Alao et al. | |
| 7,716,355 B2 * | 5/2010 | McCloghrie et al. | 709/230 |
| 7,725,784 B2 * | 5/2010 | Laouamri et al. | 714/724 |
| 7,742,183 B2 * | 6/2010 | Sato | 358/1.15 |
| 7,761,520 B2 * | 7/2010 | Fujimori | 709/206 |
| 7,788,403 B2 | 8/2010 | Darugar et al. | |
| 7,853,643 B1 | 12/2010 | Martinez et al. | |
| 7,898,385 B2 | 3/2011 | Kocher | |
| 7,908,608 B2 * | 3/2011 | Ozor et al. | 719/316 |
| 7,936,710 B2 | 5/2011 | Rodriguez et al. | |
| 8,074,271 B2 | 12/2011 | Davis et al. | |
| 8,244,843 B1 * | 8/2012 | Primerano et al. | 709/223 |
| 2002/0055924 A1 * | 5/2002 | Liming | 707/100 |
| 2002/0138582 A1 | 9/2002 | Chandra et al. | |
| 2002/0199096 A1 | 12/2002 | Wenocur et al. | |
| 2003/0115466 A1 | 6/2003 | Aull et al. | |
| 2003/0131051 A1 | 7/2003 | Lection et al. | |
| 2003/0159056 A1 | 8/2003 | Cromer et al. | |
| 2003/0219129 A1 * | 11/2003 | Whelan et al. | 380/270 |
| 2004/0040026 A1 | 2/2004 | Farrugia | |
| 2004/0059925 A1 | 3/2004 | Benhammou et al. | |
| 2004/0073727 A1 | 4/2004 | Moran et al. | |
| 2004/0083378 A1 | 4/2004 | LeRose | |
| 2004/0104266 A1 | 6/2004 | Bolle et al. | |
| 2004/0151322 A1 | 8/2004 | Sovio et al. | |
| 2004/0158625 A1 | 8/2004 | Neale | |
| 2004/0204778 A1 | 10/2004 | Lalapeth et al. | |
| 2004/0250087 A1 | 12/2004 | Ray et al. | |
| 2005/0005063 A1 | 1/2005 | Liu et al. | |
| 2005/0005131 A1 | 1/2005 | Yoshida et al. | |
| 2005/0033703 A1 | 2/2005 | Holdsworth | |
| 2005/0061875 A1 | 3/2005 | Zai et al. | |
| 2005/0105508 A1 | 5/2005 | Saha | |
| 2005/0109841 A1 | 5/2005 | Ryan et al. | |
| 2005/0193213 A1 | 9/2005 | Johnson et al. | |
| 2005/0228993 A1 | 10/2005 | Silvester et al. | |
| 2005/0235143 A1 | 10/2005 | Kelly | |
| 2005/0242921 A1 | 11/2005 | Zimmerman et al. | |
| 2005/0262229 A1 | 11/2005 | Gattu et al. | |
| 2006/0021032 A1 * | 1/2006 | Challener et al. | 726/22 |
| 2006/0022799 A1 | 2/2006 | Juels | |
| 2006/0023674 A1 | 2/2006 | Goring et al. | |
| 2006/0053210 A1 | 3/2006 | Dague et al. | |
| 2006/0059253 A1 | 3/2006 | Goodman et al. | |
| 2006/0064599 A1 * | 3/2006 | Yoshida | 713/182 |
| 2006/0078124 A1 * | 4/2006 | Whelan et al. | 380/273 |
| 2006/0095957 A1 | 5/2006 | Lundblade et al. | |
| 2006/0132304 A1 | 6/2006 | Cabell | |
| 2006/0174130 A1 | 8/2006 | Noble | |
| 2006/0174326 A1 * | 8/2006 | Ginter et al. | 726/3 |
| 2006/0195594 A1 | 8/2006 | Fujimori et al. | |
| 2006/0208066 A1 | 9/2006 | Finn et al. | |
| 2006/0226950 A1 | 10/2006 | Kanou et al. | |
| 2006/0230437 A1 | 10/2006 | Boyer et al. | |
| 2006/0259961 A1 | 11/2006 | Joffray | |
| 2007/0057057 A1 | 3/2007 | Andresky et al. | |
| 2007/0064623 A1 | 3/2007 | Brahmaroutu | |
| 2007/0067642 A1 | 3/2007 | Singhal | |
| 2007/0067833 A1 | 3/2007 | Colnot | |
| 2007/0118474 A1 * | 5/2007 | Tushie et al. | 705/41 |
| 2007/0169183 A1 | 7/2007 | Kipnis et al. | |
| 2007/0174907 A1 | 7/2007 | Davis | |
| 2007/0180086 A1 | 8/2007 | Fang et al. | |
| 2007/0186106 A1 | 8/2007 | Ting et al. | |
| 2007/0209040 A1 | 9/2007 | Alstad | |
| 2007/0214369 A1 | 9/2007 | Roberts et al. | |
| 2007/0217425 A1 * | 9/2007 | Claise et al. | 370/392 |
| 2007/0249323 A1 | 10/2007 | Lee et al. | |
| 2007/0250915 A1 | 10/2007 | Thibadeau | |
| 2007/0276935 A1 | 11/2007 | Liu | |
| 2007/0278291 A1 | 12/2007 | Rans et al. | |
| 2007/0282951 A1 | 12/2007 | Selimis et al. | |
| 2007/0283145 A1 | 12/2007 | Gressel et al. | |
| 2008/0010674 A1 | 1/2008 | Lee | |
| 2008/0016370 A1 | 1/2008 | Libin et al. | |
| 2008/0095339 A1 | 4/2008 | Elliott et al. | |
| 2008/0133391 A1 | 6/2008 | Kurian et al. | |
| 2008/0204429 A1 | 8/2008 | Silverbrook et al. | |
| 2008/0257952 A1 | 10/2008 | Zandonadi | |
| 2009/0013190 A1 | 1/2009 | Benhammou et al. | |
| 2009/0028118 A1 | 1/2009 | Gray | |
| 2009/0115573 A1 | 5/2009 | Naressi et al. | |
| 2009/0157700 A1 * | 6/2009 | Van Vugt | 707/100 |
| 2009/0248842 A1 * | 10/2009 | Hashimoto et al. | 709/221 |
| 2009/0259588 A1 | 10/2009 | Lindsay | |
| 2010/0077091 A1 | 3/2010 | Sarkar et al. | |
| 2010/0140358 A1 | 6/2010 | Couck | |
| 2010/0318798 A1 | 12/2010 | Binding et al. | |
| 2011/0264926 A1 | 10/2011 | Guthery | |

FOREIGN PATENT DOCUMENTS

| | | |
|---|---|---|
| EP | 1705941 | 9/2006 |
| EP | 1895445 | 3/2008 |
| EP | 2048591 | 4/2009 |
| GB | 2358500 | 7/2001 |
| JP | 2006-79443 | 3/2006 |
| WO | WO 98/52136 | 11/1998 |
| WO | WO 2005/078465 | 8/2005 |
| WO | WO 2006/013162 | 2/2006 |
| WO | WO 2007/138488 | 12/2007 |

OTHER PUBLICATIONS

Written Opinion for International (PCT) Patent Application No. PCT/US10/26477, mailed Apr. 28, 2010.

U.S. Appl. No. 12/627,822, filed Nov. 30, 2009, Robinton et al.

"RFC 1661: The Point-to-Point Protocol (PPP)," Network Working Group (W. Simpson, ed.), Jul. 1994, pp. 1-52.

"RFC 707: A High-Level Framework for Network-Based Resource Sharing," Network Working Group, Jan. 1976, pp. 1-28.

Aboba, B. et al., "RFC 3748, Extensible Authentication Protocol," Network Working Group (H. Levkowetz, ed.), Jun. 2004, pp. 1-67.

(56) References Cited

OTHER PUBLICATIONS

Arkko, J. et al., "RFC 4187: Extensible Authentication Protocol Method for 3rd Generation Authentication and Key Agreement (EAP-AKA)," Network Working Group, Jan. 2006, pp. 1-79.
Benaloh, J. et al., "Generalized Secret Sharing and Monotone Functions," Advances in Cryptology—CRYPTO '88, Santa Barbara, CA (S. Goldwasser ed., Aug. 1988); Lecture Notes in Computer Science, vol. 403 (G. Goos and J. Hartmanis, eds. 1990), pp. 27-35.
Blumenthal, U. et al., "RFC 3826: The Advanced Encryption Standard (AES) Cipher Algorithm in the SNMP User-based Security Model," Network Working Group, Dec. 2002, pp. 1-16.
Blumenthal, U. et al., "Standard 62—RFC 3414: User-based Security Model (USM) for Version 3 of the Simple Network Management Protocol (SNMPv3)," Network Working Group, Dec. 2002, available at www.ietf.org/rfc/rfc3414.txt, pp. 1-88.
Bormann, C. et al., "RFC 3095: RObust Header Compression (ROHC): Framework and Four Profiles: RTP, UDP, ESP, and Uncompressed," Network Working Group, Jul. 2001, available at www.ietf.org/rfc/rfc3095.txt, pp. 168.
Case, J. et al., "Standard 62—RFC 3412: Message Processing and Dispatching for the Simple Network Management Protocol (SNMP)," Network Working Group, Dec. 2002, available at www.ietf.org/rfc/rfc3412.txt, pp. 1-43.
Casner, S. et al., "RFC 2508: Compressing IP/UDP/RTP Headers for Low-Speed Serial Links," Network Working Group, Feb. 1999, pp. 1-24.
Chiu, A., "RFC 2695: Authentication Mechanisms for ONC RPC," Network Working Group, Sep. 1999, pp. 1-18.
Degermark, M., ed., "RFC 3096: Requirements for Robust IP/UDP/RTP Header Compression," Network Working Group, Jul. 2001, pp. 1-8.
Eisler, M., ed., "RFC 4506: XDR: External Data Representation Standard," replaced RFC 1832, Network Working Group, May 2006, pp. 1-27.
Finking, R. et al., "RFC 4997: Formal Notation for RObust Header Compression (ROHC-FN)," Network Working Group, Jul. 2007, pp. 1-62.
Geer, D.E. et al., "Threshold Cryptography for the Masses," Sixth International Financial Cryptography Conference, Southampton, Bermuda, Mar. 2002, Revised Papers, Lecture Notes in Computer Science, vol. 2357 (2003), pp. 220-237.
Guthery, S. et al., "IP and ARP over ISO 7816," Internet Draft, Network Working Group, Jan. 2001, pp. 1-8.
Guthery, S. et al., "IP/TCP/UDP Header Compression for ISO 7816 Links," Internet Draft, Network Working Group, Jan. 2001, pp. 1-8.
Guthery, S., "EchoNets, E-memes, and Extended Realities," Dr. Dobb's Journal, Apr. 1, 1994, pp. 72-84, also available at http://www.drdobbs.com/architect/184409220.
Guthery, S., "Wireless Relay Networks," IEEE Network, vol. 11, No. 6, Nov.-Dec. 1997, pp. 46-51.
Guthery, S.B., "Group Authentication Using the Naccache-Stern Public-Key Cryptosystem", arXiv.org > cs > arXiv:cs/0307059 (2003), 7 pages.
Harrington, D. et al., "Secure Shell Transport Model for SNMP," Internet Draft, Network Working Group, Oct. 11, 2006, pp. 1-37.
Harrington, D. et al., "Standard 62—RFC 3411: An Architecture for Describing Simple Network Management Protocol (SNMP) Management Frameworks," Network Working Group, Dec. 2002, available at www.ietf.org/rfc/rfc3411.txt, pp. 1-64.
Harrington, D. et al., "Transport Subsystem for the Simple Network Management Protocol (SNMP)," Internet Draft, Network Working Group, Dec. 13, 2006, pp. 1-34.
Harrington, D., "Transport Security Model for SNMP," Internet Draft, Network Working Group, Oct. 11, 2006, pp. 1-34.
Housley, R. et al. "RFC 4334: Certificate Extensions and Attributes Supporting Authentication in Point-to-Point Protocol (PPP) and Wireless Local Area Networks (WLAN)," Network Working Group, Feb. 2006, pp. 1-11.
Jonson, L-E. et al., RFC 4815: RObust Header Compression (ROHC): Corrections and Clarifications to RFC 3095, Network Working Group, Feb. 2007, pp. 1-33.
Jonsson, L-E. et al., "RFC 4995: The Robust Header Compression (ROHC) Framework," Network Working Group, Jul. 2007, pp. 1-40.
Jonsson, L-E., "RFC 3759: RObust Header Compression (ROHC): Terminology and Channel Mapping Examples," Network Working Group, Apr. 2004, pp. 1-20.
Koren, T. et al., "RFC 3544: IP Header Compression over PPP," Network Working Group, Jul. 2003, pp. 1-14.
Larzen, L-A. et al. "RFC 3828: The Lightweight User Datagram Protocol (UDP-Lite)," Network Working Group, Sep. 2006, pp. 1-12.
Leach, P. et al., "RFC 4122: A Universally Unique IDentifier (UUID) URN Namespace," Network Working Group, Jul. 2005, pp. 1-32.
Levi, D. et al., "Standard 62—RFC 3413: Simple Network Management Protocol (SNMP) Application," Network Working Group, Dec. 2002, available at www.ietf.org/rfc/rfc3413.txt, pp. 1-74.
McCloghrie, K. et al., eds., "RFC 2579: Textual Conventions for SMIv2," Network Working Group, Apr. 1999, pp. 1-26.
McCloghrie, K. et al., eds., "RFC 2580: Conformance Statements for SMIv2," Network Working Group, Apr. 1999, pp. 1-29.
McCloghrie, K., ed., "Standard 58—RFC 2578: Structure of Management Information Version 2 (SMIv2)," Network Working Group, Apr. 1999, pp. 1-43.
Naccache et al., "A New Public-Key Cryptosystem," published in W. Fumy, Ed., Advances in Cryptology—EUROCRYPT '97, vol. 1233 of Lecture Notes in Computer Science, pp. 27-36, Springer-Verlag, 1997.
Neuman, C. et al., "RFC 4120: The Kerberos Network Authentication Service (V5)," Network Working Group, Jul. 2005, pp. 1-138.
Pelletier, G., "RFC 4019: RObust Header Compression (ROHC): Profiles for User Datagram Protocol (UDP) Lite," Network Working Group, Apr. 2005, pp. 1-23.
Prafullchandra, H., "RFC 2875: Diffie-Hellman Proof-of-Possession Algorithms," Network Working Group, Jul. 2000, pp. 1-23.
Presuhn, R., ed., "Standard 62—RFC 3416: Version 2 of the Protocol Operations for the Simple Network Management Protocol (SNMP)," Network Working Group, Dec. 2002, pp. 1-31.
Presuhn, R., ed., "Standard 62—RFC 3417: Transport Mappings for the Simple Network Management Protocol (SNMP)," Network Working Group, Dec. 2002, pp. 1-19.
Presuhn, R., ed., Standard 62—RFC 3418: Management Information Base (MIB) for the Simple Network Management Protocol (SNMP), Network Working Group, Dec. 2002, pp. 1-26.
Rescorla, E., "RFC 2631: Diffie-Hellman Key Agreement Method," Network Working Group, Jun. 1999, pp. 1-13.
Shamir, "How to Share a Secret," Communications for the ACM, Nov. 1979, pp. 612-613.
Simpson, W., "RFC 1994: PPP Challenge Handshake Authentication Protocol (CHAP)," Network Working Group, Aug. 1996, pp. 1-12.
Simpson, W., ed., "RFC 1662: PPP in HDLC-like Framing," Network Working Group, Jul. 1994, pp. 1-25.
Srinivasan, R. et al., "RFC 1831: RPC: Remote Procedure Call Protocol Specification Version 2," Network Working Group, Aug. 1995, pp. 1-18.
Vanderveen, M. et al., RFC 4763: Extensible Authentication Protocol Method for Shared-secret Authentication and Key Establishment (EAP-SAKE), Network Working Group, Nov. 2006, pp. 1-46.
Vollbrecht, J. et al., "RFC 4137: State Machines for Extensible Authentication Protocol (EAP) Peer and Authenticator," Network Working Group, Aug. 2005, pp. 1-51.
Wijnen, B. et al., "Standard 62—RFC 3415: View-based Access Control Model (VACM) for the Simple Network Management Protocol (SNMP)," Network Working Group, Dec. 2002, available at www.ietf.org/rfc/rfc3415.txt, pp. 1-39.
ISO/IEC 8825-1, "Information technology—ASN.1 encoding rules: Specification of Basic Encoding Rules (BER), Canonical Encoding Rules (CER) and Distinguished Encoding Rules (DER)," 2008.
Wieringa, R. et al., "The identification of objects and roles," Technical Report IR-267, Faculty of Mathematics and Computer Science, Vrije Universiteit, Amsterdam, 1991, pp. 1-15.
Official Action for Canadian Patent Application No. 2,755,367 dated Nov. 19, 2013, 2 pages.

(56) References Cited

OTHER PUBLICATIONS

Official Action (with English translation) for Chinese Patent Application No. 201080020954.9 mailed Dec. 4, 2013, 15 pages.

Extended European Search Report for European Patent Application No. 10751224.6, dated Apr. 29, 2013, 6 pages.

Zhang et al. "Plugging a Scalable Authentication Framework into Shibboleth," Proceedings of the 14th IEEE International Workshops on Enabling Technologies: Infrastructure for Collaborative Enterprise (WETICE '05, Jun. 2005, pp. 271-276.

"ISO/IEC 7816 Part 4: Interindustry command for interchange," International Organization for Standardization, Nov. 26, 1998, 86 pages [retrieved from: http://www.ttfn.net/techno/smartcards/iso7816_4.html#ss5_6].

Schwarzoff et al. "Government Smart Card Interoperability Specification Version 2.1," National Institute of Standards and Technology, Jul. 16, 2003, Interagency Report 6887, 2003 Edition, 229 pages.

Official Action for Australia Patent Application No. 2010222859, mailed May 19, 2014 4 pages.

English Translation of Official Action for Japan Patent Application No. 2011-554098, mailed Jan. 7, 2014 7 pages.

English Translation of Official Action for Russia Patent Application No. 2011141076, May 26, 2014 4 pages.

Official Action with English Translation for China Patent Application No. 201080020954.9, dated Jul. 29, 2014 17 pages.

International Preliminary Report on Patentability for International (PCT) Patent Application No. PCT/US2010/026477, dated Sep. 13, 2011 5 pages.

Official Action for Canada Patent Application No. 2,755,367, dated Oct. 6, 2014 3 pages.

* cited by examiner

USE OF SNMP FOR MANAGEMENT OF SMALL FOOTPRINT DEVICES

CROSS-REFERENCE TO RELATED APPLICATIONS

This Application claims the benefit of U.S. Provisional Application No. 61/160,177, filed Mar. 13, 2009, the entire disclosure of which is hereby incorporated herein by reference.

FIELD OF THE INVENTION

The present invention relates generally to device networks and mechanisms for managing the same.

BACKGROUND

According to IETF RFC 3416, "Version 2 of the Protocol Operations for the Simple Network Management Protocol (SNMP)", in order to interact with a set of data elements in an SNMP-managed device, one sends to the device a Protocol Data Unit (PDU) consisting of the type of operation that one wishes to perform followed by a sequence of name-value pairs. The semantics of the PDU are that the operation should be performed on each of the named data elements using the value associated with the name.

There are two shortcomings of this semantics. First, the only operations allowed in RFC 3416 are the following:
GET
GET-NEXT
GET-BULK
RESPONSE
SET
INFORM
TRAP
REPORT If one wishes to perform additional operations, one is obliged to create virtual variables. The virtual variables are then interacted with in order to cause the desired operation to take place.

The second shortcoming is that the same command must be used applied to all the name-value pairs in the PDU. If one wants to SET a variable before doing a GET on a second variable, two separate and distinct PDUs are required (i.e., two messages). This requires a greater amount of messaging and message processing, thereby consuming network (e.g., bandwidth) and processing (e.g., processing units and memory) resources.

SUMMARY

In dealing with small footprint devices, such as Integrated Circuit Cards (ICCs), it is desirable to minimize: 1) the amount of storage used; 2) the amount of communication with the device; 3) the amount of computational resources required; and 4) the size of each message. While maintaining complete compliance with IEFC RFC 3416 and employing all the desirable secure communication features of SNMPv3, embodiments of the present invention define means of applying this protocol that appropriate for use with small footprint devices, such as ICCs.

More specifically, one embodiment of the present invention provides mechanisms for connecting small footprint devices into networks managed by SNMP, thus providing a means to manage data stored in the small footprint device using a secure, lightweight communication protocol, such as the SNMP communication protocol or variants thereof. A second embodiment of the present invention provides mechanisms that enable the tamper-resistant properties of an ICC to enhance the security of processing SNMP messages.

In accordance with at least some embodiments of the present invention, a device management method is provided that generally comprises:

generating a command message at a manager, the command message including at least one object identifier, each object identifier comprising a variable identification portion and a command information portion; and transmitting the command message to a managed device.

The managed device may correspond to a small footprint device and the command message may comprise an SNMP message. Small footprint devices may include any type of constrained resource. The resources may be constrained across one or more dimensions in that the small footprint device may have a relatively small amount of memory, processing ability, bandwidth, firmware space, etc. that limits the device's ability to receive and/or process commands and messages containing commands. Examples of small footprint devices include, but are not limited to, ICCs, smart cards, Subscriber Identity Module (SIM) cards, Security Authentication Module (SAM) cards, printers, readers, components within a printer or reader, wireless sensor network nodes, network appliances and peripherals, electronic locks and locking mechanisms, protocol converters (e.g., a Wiegand to SDI converter) or the like.

One notion of SNMP is that every managed data object has a unique Object Identifier (OID) within its management context. An OID is a finite sequence of numbers separated by dots. SNMP uses the OID data type defined in ISO/IEC 8825-1, the entire contents of which are hereby incorporated herein by reference, to represent names. ISO/IEC 8825-1 defines an OID name as a sequence of non-zero integer values and gives a digital encoding for such names. ISO/IEC 8825-1 provides neither a semantic for the sequence of integers nor any guarantee that there will be two OID names for the same object or two objects with the same OID name.

There is, however, a widely-recognized and used international registry of OID names that does supply Object Identifiers in the registry with this guarantee (i.e., the guarantee that two OID names will not be the same). This registry organizes the OID namespace as a tree exactly analogous to the Linnaean biological taxonomy. The root of the tree has three branches: ITU-T, ISO and Joint-ISO-ITU-T.

An entity or enterprise can request a leaf node of this internationally-recognized OID registry tree and this leaf becomes the root of a namespace within the global OID namespace that is managed by the entity. The OID for the root of an entity tree in the OID registry namespace is represented as follows:

iso(1).org(3).dod(6).internet(1).private(4).enterprise(1).entity(XXXXX)

The semantics of all OID names that start with these first seven sub-identifiers can be and are defined by entity. Since no other entity will be allocated an OID starting with the same first seven sub-identifiers, all names assigned by the entity under this root are unique in the global OID namespace. The typical use of a namespace root is to construct names of objects specific to the entity that owns the root. Using a root in the international namespace guarantees that these names are globally unique in the namespace and can't be confused with names being used by other entities. For example:

iso(1).org(3).dod(6).internet(1).private(4).enterprise(1).entity(XXXXX).card(1)

might be the root of the identifier of all cards produced by the entity and iso(1).org(3).dod(6).internet(1).private(4).enterprise(1).entity(XXXXX).card(1).prox(1)

might be the root name of proximity cards produced by the entity. Similarly, iso(1).org(3).dod(6).internet(1).private(4).enterprise(1).entity(XXXXX).reader(2)

might be the root of the identifier of all readers produced by the entity and iso(1).org(3).dod(6).internet(1).private(4).enterprise(1).entity(XXXXX).

reader(2).prox(1).readertype(YYYY).color(3).connectortype(4).indicatortype(5)

might be the name of a particular reader with a particular color, connector type, and indicator type used to communicate with a particular card type. This means that all bytes after the root byte allocated to an entity are controlled by the entity that has been allocated the root and as long as these bytes follow the encoding rules of ISO/IEC 8825-1 these OIDs are compliant with IETF RFC 3416 and can be used in SNMP messages wherever an OID is called for.

It is thus one aspect of the present invention to extend the semantics of a standardized control protocol namespace, such as SNMP, to enable small footprint devices, such as ICCs, to be devices in SNMP managed networks.

It is another aspect of the present invention to map the security and access control constructs of SNMP onto the security and access control constructs of a particular small footprint device, such as an ICC.

It is yet another aspect of the present invention to use an ICC, for example, to embody the security and access control mechanisms of an arbitrary SNMP-managed device, thereby enhancing the security profile of that device by performing SNMP functions inside a tamper-resistant and/or tamper-evident device or boundary.

The Summary is neither intended nor should it be construed as being representative of the full extent and scope of the present invention. The present invention is set forth in various levels of detail and the Summary as well as in the attached drawings and in the detailed description of the invention and no limitation as to the scope of the present invention is intended by either the inclusion or non inclusion of elements, components, etc. in the Summary. Additional aspects of the present invention will become more readily apparent from the detailed description, particularly when taken together with the drawings.

DETAILED DESCRIPTION

The invention will be illustrated below in conjunction with an exemplary access control system. Although well suited for use with, e.g., a system using access control readers and/or credentials, the invention is not limited to use with any particular type of access control system or configuration of system elements. Those skilled in the art will recognize that the disclosed techniques may be used in any application in which it is desirable to control small footprint devices with a lightweight control protocol or to enhance the security of existing SNMP-managed devices The exemplary systems and methods of this invention will also be described in relation to analysis software, modules, and associated analysis hardware. However, to avoid unnecessarily obscuring the present invention, the following description omits well-known structures, components and devices that may be shown in block diagram form that are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1:
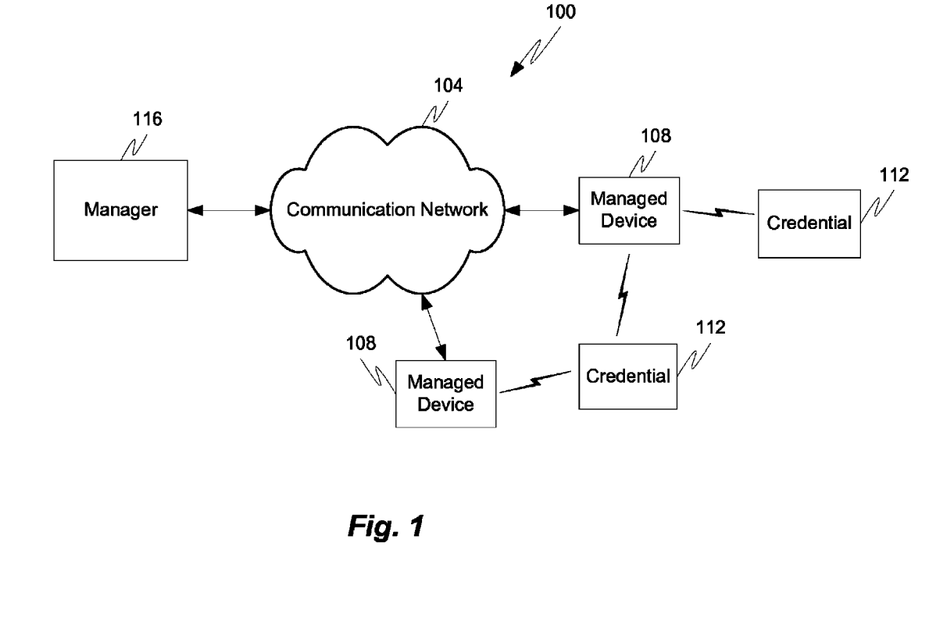
FIG. 1 depicts a first configuration of a managed system in accordance with embodiments of the present invention.

Referring initially to FIG. 1, details of a first configuration of a managed system 100 are depicted in accordance with at least some embodiments of the present invention. The managed system 100 generally includes a communication network 104 that connects one or more managed devices 108 to a manager 116. The managed devices 108 may be any type of processing resource capable of being remotely controlled over the communication network 104. Exemplary communication networks 104 that may be used in accordance with at least some embodiments of the present invention include, without limitation, wired networks that utilize the one or more of the Wiegand protocol, RS422, RS485, TCP/IP, etc. or wireless networks that employ one or more of Wi-Fi, Bluetooth, Zigbee, optical coupling, audio coupling, and combinations thereof.

In accordance with at least one embodiment of the present invention, the managed device 108 comprises one or more of a credential reader (e.g., contact reader, contactless reader, NFC-based phone, magstripe reader, Wiegand reader, barcode scanner/reader, or any other machine reading device capable of reading, writing, or rewriting a credential, or printer (e.g., a device adapted to create printed credentials that may or may not be machine readable such as contact or contactless credentials), or a combination thereof. In accordance with at least some embodiments of the present invention, the managed device 108 may correspond to a small footprint device itself. Alternatively, or in addition, the managed device 108 may have one, two, three, or more small footprint devices within its borders (i.e., inserted in the managed device 108 or integral to the managed device 108). In some embodiments of the present invention, a credential 112 inserted into the managed device 108 may be considered a small footprint device.

In embodiments where the managed device 108 includes reading functionality, the managed device 108 may be adapted to communicate with credentials 112 via contactless and/or contact-based communication protocols. Examples of communication protocols employed by the managed device 108 to communication with a credential 112 include, without limitation, RF-based communications (e.g., ISO 14443A, ISO 14443B, ISO 15693, Near Field Communications, Bluetooth, Zigbee, Wi-Fi, and any other type of communication protocol that utilizes an RF field at 125 kHz or 13.56 MHz, for example), magnetic-based communications, light-based communications, wire-based communications including ISO 7816, I2C, SPI, as well as other known or yet to be developed communication protocols.

In accordance with at least some embodiments of the present invention, the communication network 104 is adapted to carry messages between the components connected thereto. Thus, a manager 116 sends messages to and receives messages from a managed device 108 via the communication network 104. The communication network 104 may comprise any type of known communication network including wired and wireless or combinations of communication networks and may span long or small distances. The protocols used by the communication network 104 to manager 116/managed device 108 communications may include, but is not limited to, the TCP/IP protocol, Power-Over-Ethernet (POE), Wi-Fi, Wiegand Protocol, RS 232, RS 485, RS422, Current Loop, F2F, Bluetooth, Zigbee, GSM, SMS, Wi-Fi, optical, audio and so forth. The Internet is an example of the communication network 104 that constitutes an IP network consisting of many computers and other communication devices located locally and all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a cellular communication network, a satellite communication network, any type of enterprise network, and any other type of packet-switched or circuit-switched network known in the art. It can be appreciated that the communication network 104 need not be limited to any one network type, and instead may be comprised of a number of different networks and/or network types.

The manager 116 may be adapted to, at various points in time, send messages, possibly including commands, to one or more managed device 108. The types of messages sent to the managed devices 108 may vary depending upon the functionality of the managed device 108 and the internal resources and capabilities of the managed device 108. In accordance with at least some embodiments of the present invention, the manager 116 is adapted to generate and send SNMP messages to a managed device 108 directed toward a particular managed object associated with the managed device 108 (i.e., the managed device 108 or an object within the managed device 108). Every managed data object within a managed device has a unique OID. There are exactly eight operations currently defined in the SNMP that can be performed on a managed data object, two of which are GET ("read") and SET ("write") operations.

Managed data objects are accessed via a virtual information store, termed the Management Information Base (MIB). The MIB, although not depicted, may correspond to a data store, database or other organized data structure connected to the communication network 104 and accessible by the manager 116. Objects in the MIB are defined using the mechanisms defined IETF RFC 2578, Structure of Management Information Version 2 (SMIv2). Variables within a managed object may be accessed and managed by the manager 116 using the GET operation, SET operation, or any other type of SNMP operation.

The term "variable" refers to an instance of a non-aggregate object type defined according to the conventions set forth in the SMIv2 [RFC2578] and the textual conventions based on the SMI [RFC2579]. The term "variable binding" refers to the pairing of the name of a variable and its associated value. Accordingly, the GET operation can be used by the manager 116 to retrieve the current value of a particular variable and the SET operation can be used by the manager 116 to change the value of a particular variable to a new value.

By the means and methods of certain embodiments of the present invention, the manager 116 is adapted to send additional commands in the SNMP format to the managed device 108. As an example, if the managed device 108 corresponds to an ICC, then the command may be defined in well known ICC standards, such as ISO/IEC 7816. The command standards being known to the manager 116 and managed device 108 can serve as the mapping of commands in the OID (e.g., by a command identifier) to commands to be executed by the managed device 108. An SNMP command sent to the managed device 108 may comprise a single OID including a sequence of bytes beginning with the identifier of the managed data object followed by command information, which may also be a sequence of bytes directly following the sequence of object-identifying bytes in the OID. As an example, a command to an ICC may comprise a sequence of bytes denoted as follows:

$$1.3.6.1.4.1.29240.1. \text{CLA. INS. P1. P2. L. } D_1. D_2 \ldots D_L$$

The initial sequence of bytes (1.3.6.1.4.1.29240.1) is the variable identifier (henceforth "VAR") identifying the data object—the ICC—to be managed, the next four bytes (CLA. INS. P1. P2) are called by ISO/IEC 7816-4 the command body of the ICC operation and the trailing bytes ($L. D_1. D_2 \ldots D_L$) are called by ISO/IEC 7816-4 the command data of the ICC operation.

According to embodiments of the present invention, this command can be sent to the managed device 108 using SNMP by using an SNMP SET PDU with reference to the OID:

$$1.3.6.1.4.1.29240.1. \text{CLA. INS. P1. P2. L. } D_1. D_2 \ldots D_L$$

In this case, the SNMP data associated with this OID in the PDU encoding is set to NULL because the data to be used in the operation is in the OID. Multiple commands performing two different operations within the managed device 108 can be sent with one SNMP message by making reference to the following OID:

$$1.3.6.1.4.1.29240.1..CLA^1.INS^1.P1^1.P2^1.L^1.D_1^1.D_2^1 \ldots D_L^1.CLA^2.INS^2.P1^2.P2^2.L^2.D_1^2.D_2^2 \ldots D_L^2$$

where the bytes with superscript 1 comprise the first command to be executed by the managed device 108 and the bytes with superscript 2 comprise the second command to be executed by the managed device 108. The commands may be executed in order of appearance in the OID (e.g., the first command is executed before the second command) or they may be executed based on other considerations, such as whether one command is directed toward a sensitive variable and the other is not.

Figure 2:
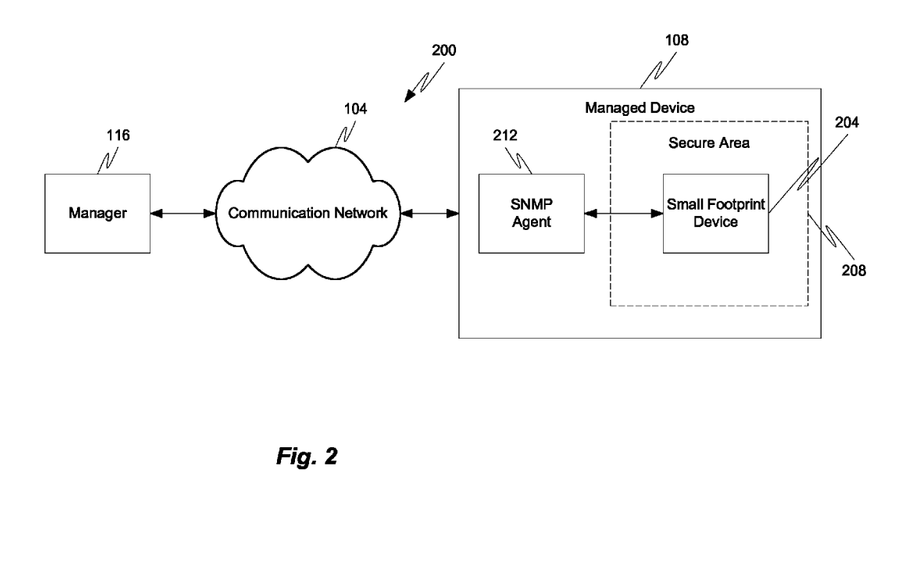
FIG. 2 depicts a second configuration of a managed system in accordance with embodiments of the present invention.

With reference now to FIG. 2, an alternative configuration of the managed system 200 will be described in accordance with at least some embodiments of the present invention. Most SNMP managed devices 108 are neither tamper-resistant nor tamper-evident and according to RFC 3414 "User-based Security Model (USM) for version 3 of the Simple Network Management Protocol (SNMPv3)", the entire contents of which are hereby incorporated herein by reference, these devices store sensitive data such as cryptographic keys and perform operations using this data such as encryption and decryption. Because of the lack of physical security protections, e.g., a tamper-resistance and tamper-evidence, the security and access control mechanisms implemented by most SNMP-managed devices 108 are easily attacked and altered. More specifically, the security features of the SNMP communication protocol address the security of data being sent to and received from the managed device 108, but they do not address the security and privacy of the data residing within the managed device 108. In cases where the managed device is not itself physically and/or logically secure (e.g., if the managed device 108 is a printer, a router, a desktop computer, an IP telephone, an application running on a general-purpose operating system, or the like), then the existence of an SNMP-accessible variable together with its current value is open to discovery and mal-use by unauthorized entities. Accordingly, it may be desirable to move SNMP variables bound to sensitive data along with the security and access control mechanisms used to manage them inside a tamper-resistant and tamper-evident boundary 204 in an SNMP-compliant manner to enhance the security of the managed device 108 without disturbing the device's participation in the managed system 200.

As one example, the managed device 108 may comprise an ICC within the secure area 208 of the device. The ICC 204 may be in communication with an SNMP agent 212 that is responsible for initially receiving the command from the manager 116 and determining whether the command is to be processed by the managed device 108 (i.e., is directed toward a non-sensitive variable) or by the ICC 204. In the previous example described above, the node VAR marked the boundary between data processing done outside the ICC and data processing done inside an ICC. In the embodiment depicted in FIG. 2, the processing of all variables rooted at the address identified by VAR is handled inside the ICC 204. This processing can be exactly the normal command processing for the variable as is stipulated by IETF RFC 3416 or it can be a form of processing such as previously described.

As can be appreciated by one skilled in the art, the small footprint device 204 may be physically integral to the managed device 108 or may be inserted to and removed from the managed device 108.

Regardless of configuration, specific sections of the managed device's 108 Management Information Base is protected from both physical and logical compromise due to the physical and logical security properties of the small footprint device 204. The fact that a variable exists at all together with all processing for that variable using SNMP keys to protect the current value of the variable in transmission is contained within the secure area 204. In one example, the secure area 208 corresponds to the boundary of the small footprint device 204 (e.g., when the small footprint device 204 is an ICC).

Figure 3:
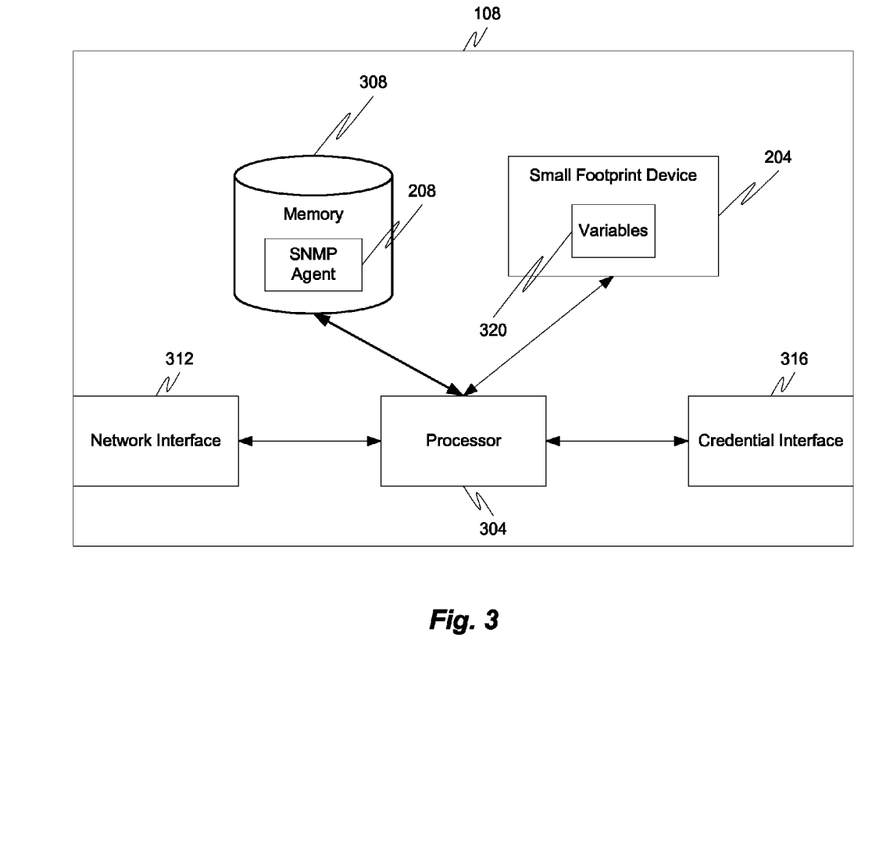
FIG. 3 depicts a managed device in accordance with embodiments of the present invention.

Referring now to FIG. 3, details of an exemplary managed device 108 will be described in accordance with at least some embodiments of the present invention. The managed device 108 comprises the ability to be managed via SNMP or house small footprint devices 204 capable of being managed via SNMP. To this extent, the managed device 108 may comprise an SNMP agent 208 stored in local memory 308 that, when executed by a local processor 304, allows the managed device 108 to receive and react to SNMP commands sent from the manager 116. More specifically, the processor 304 may be adapted to process certain SNMP commands that are directed toward variables bound to non-sensitive data. Alternatively, if the SNMP command is directed toward a variable bound to sensitive data 320, then the SNMP command is forwarded to the small footprint device 204 where the command is executed. In this particular example, the description of the variable in the device MIB causes the SNMP agent 208 to forward the SNMP packet to the small footprint device 204. The small footprint device may implement within its physically and logically secure boundary one of the defined SNMP commands such as GET or SET or it may a more specific command as described above directed toward the variable bound to sensitive data 320.

The memory 208 may comprise volatile and/or non-volatile memory. Examples of non-volatile memory include Read Only Memory (ROM), Erasable Programmable ROM (EPROM), Electronically Erasable PROM (EEPROM), Flash memory, and the like. Examples of volatile memory include Random Access Memory (RAM), Dynamic RAM (DRAM), Static RAM (SRAM), or buffer memory. In one embodiment, the memory 208 and the processor 304 are designed to utilize known security features to prevent unauthorized access to the contents of the memory 208 such as side channel analysis, DPA, and the like.

As can be appreciated by one skilled in the art, while embodiments of the present invention have been describing variables 320 in the small footprint device 204 as variables bound to sensitive data or simply sensitive variables, the small footprint device 204 may also comprise non-sensitive variables. This may depend upon the nature of the small footprint device 204 and whether it resides in a secure area 208.

The processor 304 may include any general-purpose programmable processor, digital signal processor (DSP) or controller for executing application programming (e.g., application programming residing in memory 308). Alternatively, the processor 304 may comprise a specially configured Application Specific Integrated Circuit (ASIC).

The processor 304 may also be provided with control circuitry capable of manipulating an access control device. The access control device is designed to secure a point of access or resource being protected by the managed device 108. The processor 304 is enabled to communicate with the access control device via a network interface 312 or via some other dedicated access control interface. Examples of a typical access control device include, without limitation, an electronic lock, a magnetic lock, or an electric strike for a door, a lock for a computer system, a lock for a database, a lock on a financial account, a lock on access to a computer, or a lock on a computer application. In one embodiment, the processor 304 actuates the access control device by sending a signal to the access control device via the network interface 312 based on results of an access decision made by the processor 304. Optionally, the access control device may be integral to the managed device 108 in one embodiment, in which case an access control device interface would not be necessary. In an alternative embodiment, an access control device is external to the managed device 108, thus necessitating some sort of interface between the managed device 108 and access control device. Examples of an access control device interface include any type of data port such as a Wiegand port, Hi-O™ port, USB port, serial data port, parallel data port, a conventional wire, an Ethernet port, a wireless communication port such as a Bluetooth data interface, or any other type of wired or wireless communication interface. Additionally, the communications between the managed device 108 and the external device may also practice embodiments of the present invention described herein The network interface 312 may also be adapted to connect the managed device 108 to the communication network 104. Accordingly, communication packets or messages sent by the manager 116 to the managed device 108 are received initially by the managed device 108 at the network interface 312. These messages may be forwarded to the processor 304 for further analysis and processing. The network interface 312 provides communication capabilities between the managed device 108 and external servers or other network nodes. Such a communication interface may include a USB port, a wired modem, a wireless modem, a network adapter such as an Ethernet card and Ethernet port, a serial data port, a parallel data port, or any other communication adapter or port known in the art.

In addition to comprising a processor 304 and memory 308, the managed device 108 may also comprise a credential communication interface 316 used to communicate back and forth with the credential 112. The credential communication interface 316 may comprise an RF communication interface (e.g., an RF antenna), a magnetic communication interface (e.g., a magnetic stripe reader), an optical communication interface (e.g., an infrared detector and transmitter), an audio communication interface, an electrical contact communication interface, a slot or port for physically receiving a credential 112, or any other means of communicating information to/from a credential 112.

A power source (not depicted) may also be included in the managed device 108 to provide power to the various devices contained within the managed device 108. The power source may comprise internal batteries and/or an AC-DC converter such as a switch mode power supply or voltage regulator connected to an external AC power source.

As can be appreciated by one skilled in the art, the communication between the SNMP-managed device and the access control device can also benefit from the embodiments of the present invention. In this case, the SNMP-managed device is using SNMP to control the access control device.

Figure 4:
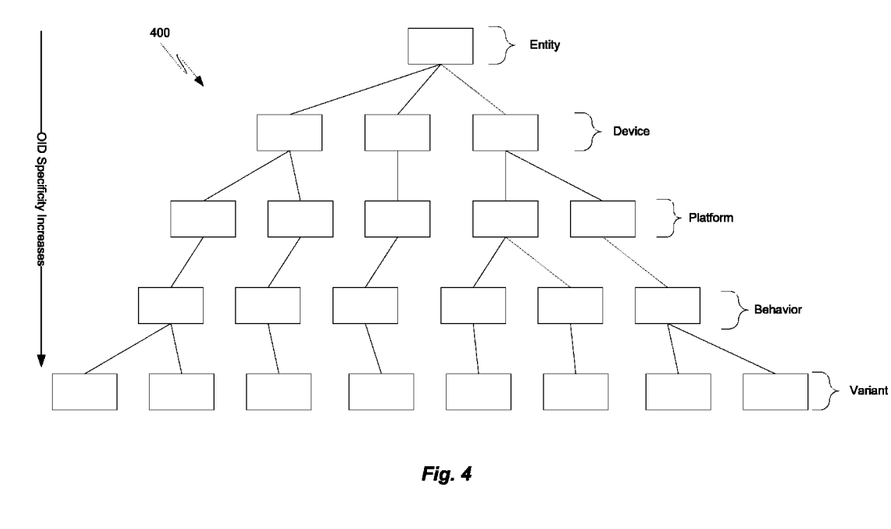
FIG. 4 depicts an exemplary data structure used in accordance with embodiments of the present invention.

With reference now to FIG. 4, an exemplary data structure 400 hierarchy will be described in accordance with at least some embodiments of the present invention. The data structure 400 may comprise a number of possible OIDs that can be used for targeting SNMP commands that are executable by small footprint devices.

OIDs used in accordance with at least some embodiments of the present invention may be registered as a series of integer sub-identifiers, each sub-identifier integer being separated from adjacent sub-identifier integers by a delimiter such as a period or the like. Alternatively, the boundaries may be defined by the number of bits (i.e., byte boundary) if the data is represented in a binary data stream.

Other well known data types that essentially provide similar functionality using a hierarchically-assigned namespace in which successive numbers of the nodes, starting at the root of the tree, identify each node in the tree include Uniform Resource Locators (URL), Uniform Resource Names (URN), Uniform Resource Identifiers (URI), Uniform Resource Characteristics (URC) among others. An entity may be assigned a particular number by the Internet Assigned Numbers Authority (IANA), RFC 4122, or others.

The data structure 300 may correspond to an MIB tree, some or all of which may be stored in a centrally located MIB and/or an MIB stored in memory 308 of the managed device 108. As noted above, an entity has the possibility of being provided exclusive assignment of an OID namespace, such assignment starting with the originating ISO node and ending with the number assigned by IANA. From that root node, the entity can create their own OIDs with the assurance that no other OID of the same value has been created by any other entity. In addition to creating OIDs that represent devices or variables within devices, the OID may also be configured to include command information (e.g., commands to be performed, parameters to be used, and/or data to be employed for an identified parameter). The commands in the OID may correspond to standardized commands that are already known by a small footprint device. The command portion of the OID, therefore, only has to identify which of the standardized commands are to be executed for a particular variable.

Figure 5:
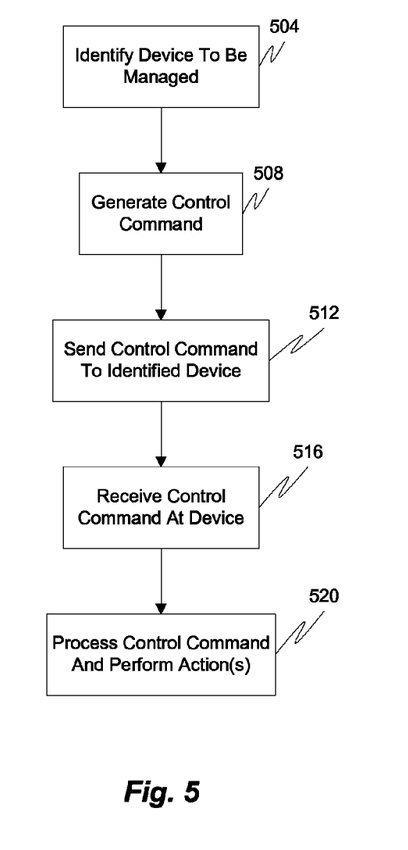
FIG. 5 is a flow chart depicting a small footprint device management method in accordance with embodiments of the present invention.

With reference now to FIG. 5, an exemplary device management method will be discussed in accordance with at least some embodiments of the present invention. The method is initiated when the manager 116 identifies one or more devices to be managed (step 504). This step may include locating a managed device 108 that is under the control of the manager 116. The method may be initiated in response to an automatic determination that a device needs some amount of management (e.g., a triggering event has occurred or the device has not been managed for more than a predetermined amount of time). Alternatively, the method may be initiated by an administrative user interacting with the manager 108 to identify the device(s) to be managed.

After the device has been identified, the manager 116 further identifies which variable or variables within the device 108 need to be retrieved, changed, updated, etc. The manager 116 then uses in the MIB associated with the device to determine identification information for the variable. More specifically, the manager 116 determines the OID associated with the variable to be managed together with the nature of the data needed to manipulate the variable.

With this information, the manager 116 continues by generating a control command (step 508). The control command is adapted to include the object identifier of the variable to be managed, the commands and parameters that will be used to manage the variable, and any additional data that will be necessary to manage the device variable (e.g., the new value for the variable). If the manager 116 is only retrieving a variable's value, then no additional data may be necessary. In accordance with at least some embodiments of the present invention, the command generated by the manager 116 may comprise a single SNMP message in the form of an OID without an associated data value. The OID contains the identification information for the device and/or variable, the commands and parameters that will be used to manage the variable, and any additional data, if necessary. All of this information is concatenated into a single string, the result of which is a single OID. In accordance with at least some embodiments of the present invention, the SNMP message may be adapted to include two, three, or more commands, all of which can be included in the same OID. This allows the manager 116 to initiate multiple actions at the managed device 108 with a single message. More specifically, the message may comprise data in the form of code defining new commands and functionality providing extensibility.

After the message has been generated at the manager 116, the message is sent to the identified device(s) (step 512). In other words, the manager 116 transmits the message across the communication network 104 to the managed device 108. This is usually accomplished by encapsulating the SNMP message in a TCP and/or UDP packet that is capable of being transmitted across the communication network 104. More specifically, the SNMP message contains the OID generated by the manager and the TCP or UDP packet identifies the address of the target device. Thus, the TCP or UDP packet is used as a transmission mechanism for the SNMP message across the communication network. As can be appreciated by one skilled in the art, the SNMP message may be encapsulated in any type of message capable of transmission across the communication network 104 in accordance with communication protocols of the communication network 104. Accordingly, embodiments of the present invention are not necessarily limited to the use of a TCP and/or UDP packet.

The managed device 108 then receives the message (step 516) and processes the message in according to IETF STD 26—Simple Network Management Protocol (step 520). When the managed device 108 receives the message it may forward it to an internal small footprint device 204 or may execute the message command itself if the command is directed toward a variable directly accessible by the managed device 108. If the command requires the alteration of a variable in the device being managed (i.e., the command is a SET command), then that variable is altered based on the data supplied in the command. Alternatively, if the command is a GET command, then the identified variable value is determined and a message is transmitted back to the manager 116 that includes the value of the variable. As can be appreciated by one skilled in the art, the communications between the manager 116 and the managed device 108 may be encrypted or otherwise protected from unwanted viewing using the teachings of IETF RFC 3414 or other means.

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described access control equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as TPM, PLD, PLA, FPGA, PAL, a communications device, such as a server, personal computer, any comparable means, or the like. In general, any device capable of implementing a state machine that is in turn capable of implementing the methodology illustrated herein can be used to implement the various data messaging methods, protocols and techniques according to this invention.

Furthermore, the disclosed methods may be readily implemented in software. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the computer arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an integrated circuit card applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for managing small footprint devices. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method, comprising:
generating a Simple Network Management Protocol (SNMP) command message at a manager, the SNMP command message comprising an object identifier, the object identifier comprising a variable identification portion and a command information portion, wherein the object identifier of the SNMP command message comprises a sequence of bytes having at least two commands therein, and wherein the at least two commands are directed toward a common variable in the managed device and cause a single component of the managed device to execute two different operations; and
transmitting the SNMP command message to a managed device, the managed device including at least one of an Integrated Circuit Card (ICC), a smart card, a Subscriber Identity Module (SIM) card, a Security Authentication Module (SAM) card, and a protocol converter.

2. The method of claim 1, wherein the managed device is the ICC.

3. The method of claim 1, wherein the managed device is the SIM card.

4. The method of claim 1, further comprising:
receiving the command message at the managed device;
utilizing the command information portion to determine the command to be executed and the parameters to be used during execution of the command; and
executing the command with the parameters at the managed device.

5. The method of claim 4, further comprising:
receiving the command at an SNMP agent contained within the managed device;
analyzing the command with the SNMP agent to determine whether the command is directed toward a sensitive or non-sensitive variable;
determining, by the SNMP agent, that the command is directed toward a sensitive variable; and
passing the command from the SNMP agent to a component associated with the sensitive variable for processing by the component, wherein the command is executed by the component within a secure area of the managed device.

6. The method of claim 1, further comprising:
encapsulating the command message in at least one of a TCP and UDP packet; and
causing the at least one of a TCP and UDP packet to be transmitted from the manager to the managed device.

7. The method of claim 1, wherein the at least two commands are executed according to order of appearance in the object identifier.

8. The method of claim 1, wherein a first of the at least two commands is executed prior to a second of the at least two commands because the first of the at least two commands is directed toward a sensitive variable that is managed inside a tamper-resistant and tamper-evident boundary and the second of the at least two commands is directed toward a non-sensitive variable that is not managed inside the tamper-resistant and tamper-evident boundary.

9. The method of claim 1, wherein SNMP data associated with the object identifier in a Protocol Data Unit (PDU) is set to NULL.

10. The method of claim 1, wherein the managed device comprises a tamper-evident and tamper-resistant boundary and wherein the single component of the managed device is associated with the common variable and resides within the tamper-evident and tamper-resistant boundary such that it is not open to discovery.

11. The method of claim 10, wherein the single component is removable from the managed device.

12. The method of claim 10, wherein the single component is integral to the managed device.

13. The method of claim 1, wherein the managed device comprises a Management Information Base containing at least one variable and processing capabilities for the at least one variable, wherein the at least one variable and the processing capabilities for the at least one variable are protected with at least one SNMP key.

14. The method of claim 13, wherein the manager comprises information regarding the at least one SNMP key.

15. A Simple Network Management Protocol (SNMP) system, comprising:
 a manager to control devices with SNMP command message, the SNMP command messages comprising an object identifier with a variable identification portion and a command information portion, wherein the object identification portion comprises a sequence of bytes having at least two commands therein and wherein the at least two commands are directed toward a common variable in a managed device and cause a single component of the managed device to execute two different operations; and
 a small footprint device operating as the managed device and to receive and process SNMP command messages transmitted by the manager, wherein the small footprint device comprises at least one of an Integrated Circuit Card (ICC), a smart card, a Subscriber Identity Module (SIM) card, a Security Authentication Module (SAM) card and a protocol converter.

16. The system of claim 15, wherein the small footprint device operates as part of an access control device.

17. The system of claim 15, wherein at least some of the SNMP command messages are transmitted from the manager to the small footprint device via at least one of a TCP and UDP packet.

18. A small footprint device to receive and process Simple Network Management Protocol (SNMP) command messages, the SNMP command messages comprising an object identifier with a variable identification portion and a command information portion, wherein the object identification portion comprises a sequence of bytes having at least two commands therein and wherein the at least two commands are directed toward a common variable in a managed device and cause a single component of the managed device to execute two different operations; and wherein the small footprint device comprises at least one of an Integrated Circuit Card (ICC), a smart card, a Subscriber Identity Module (SIM) card, a Security Authentication Module (SAM) card and a protocol converter.

19. A non-transitory computer readable medium comprising processor executable instructions stored thereon that include an object identifier, the object identifier comprising a variable identification portion and a command information portion that comprises a sequence of bytes having at least two commands therein, wherein the at least two commands are directed toward a common variable in a managed device, wherein the at least two commands cause the common variable to execute a two different operations based on the at least two commands in the command information portion of the object identifier, the managed device being or being included in at least one of an Integrated Circuit Card (ICC), a smart card, a Subscriber Identity Module (SIM) card, a Security Authentication Module (SAM) card, and a protocol converter.

20. The computer readable medium of claim 19, wherein the executable instructions are in the form of a message.

21. The computer readable medium of claim 20, wherein the medium comprises a wire.

22. The computer readable medium of claim 19, wherein the medium comprises memory residing on a network device.

23. The computer readable medium of claim 19, wherein the medium comprises memory of the managed device.

24. A method, comprising:
 generating a Simple Network Management Protocol (SNMP) command message at a manager, the SNMP command message comprising an object identifier, the object identifier comprising a variable identification portion and a command information portion, wherein the object identifier of the SNMP command message comprises a sequence of bytes having at least two commands therein, and wherein the at least two commands are directed toward different variables in the managed device and cause different components of the managed device to execute different operations; and
 transmitting the SNMP command message to a managed device, the managed device including at least one of an Integrated Circuit Card (ICC), a smart card, a Subscriber Identity Module (SIM) card, a Security Authentication Module (SAM) card, and a protocol converter.

25. A small footprint device to receive and process Simple Network Management Protocol (SNMP) command messages, the SNMP command messages comprising an object identifier that includes
 a variable identification portion identifies two different variables in the small footprint device that are managed by the SNMP command message, and wherein the command information portion comprises a sequence of bytes having at least two commands therein that identify different management actions that are performed by the two different variables in the small footprint device; and
 wherein the small footprint device comprises at least one of an Integrated Circuit Card (ICC), a smart card, a Subscriber Identity Module (SIM) card, a Security Authentication Module (SAM) card and a protocol converter.

* * * * *